US006138371A

United States Patent [19]

Lippa et al.

[11] Patent Number: 6,138,371

[45] Date of Patent: Oct. 31, 2000

[54] PACKAGE SIZE GUAGE

[75] Inventors: Thomas Georg Lippa, Osgoode; Michelle Kathleen Raizenne, Kanata; Patricia Wagers, Hull, all of Canada

[73] Assignee: Canada Post Corporation, Ottawa, Canada

[21] Appl. No.: 09/120,902

[22] Filed: Jul. 22, 1998

[51] Int. Cl.[7] ................................ G01B 3/14; G01B 5/00

[52] U.S. Cl. ................................ 33/562; 33/501; 33/613; 33/1 V

[58] Field of Search ................................ 33/562, 121, 122, 33/501, 501.05, 501.08, 501.09, 501.45, 1 V, 1 BB

[56] References Cited

U.S. PATENT DOCUMENTS

| | | | |
|---|---|---|---|
| 2,688,878 | 9/1954 | Kolisch | 73/865 |
| 2,736,095 | 2/1956 | Krauss . | |
| 4,268,967 | 5/1981 | Brana et al. . | |
| 4,422,241 | 12/1983 | Meeker | 33/563 |
| 4,742,771 | 5/1988 | Heilig . | |
| 5,031,332 | 7/1991 | Newman . | |
| 5,473,966 | 12/1995 | Cordon | 83/56 |

*Primary Examiner*—Diego Gutierrez
*Assistant Examiner*—Faye Francis
*Attorney, Agent, or Firm*—Woodard, Emhardt, Naughton, Moriarty & McNett

[57] ABSTRACT

A sizing device or gauge is provided for measuring whether an article such as a package for delivery has dimensions that lie within predetermined values of length, width and volume. The sizing device is formed by a receptacle that has a flat rectangular base wall which defines predetermined maximum values of length and width for the item, and a pair of adjacent upstanding side walls portions of which decrease in height away from adjoining ends of the walls, the height decrease being in inverse relation to the square of a respective one of the maximum height and width values. The device is useful for example in determining whether items meet the specifications of a delivery service segregating items into different categories.

11 Claims, 3 Drawing Sheets

PACKAGE SIZE GUAGE

BACKGROUND OF THE INVENTION

1. Field of the Invention

This invention relates to a new or improved sizing device or gauge for indicating whether or not an item such as a package has dimensions that fit within predetermined specifications of length, width and volume.

2. Description of the Prior Art

Postal authorities and other delivery service providers such as couriers and the like establish limits as to dimensions and weight to establish whether an item is deliverable within a particular established category, e.g. as letter mail, as a package, parcel, or some other category and there is a recognized need to provide a sizing device that is convenient to use and can be located e.g. at postal counters to facilitate a ready determination as to the correct category of an item that is to be delivered. Such a device could also be used by freight carriers and others.

U.S. Pat. No 2,736,095 Krauss discloses a volume measuring device for use in calculating the volume of shipping containers which makes use of hyperbolic curves and related scales for indicating the container volumes. U.S. Pat. No. 4,268,967 Brana et al discloses a sizing device for packages, the device involving opposed pairs of planar walls which are slidable to vary the dimension of an enclosure.

SUMMARY OF THE INVENTION

The invention provides a sizing device for indicating whether a package has dimensions that lie within predetermined specifications of length, width, and volume, comprising: a receptacle that has first and second side walls extending upwardly at right angles to each other to define a vertical corner, each said side wall having: a first section adjoining said corner and having a constant height that corresponds to the cube root of said predetermined maximum value of volume, and adjoining said first section a second section that has a height that decreases with increasing distance from said corner in inverse relation to the square of a respective one of said predetermined maximum values of length and of width.

Preferably the side walls are provided in combination with a flat rectangular base wall, the latter having dimensions corresponding to the maximum width and maximum length of the item that is to be gauged.

The device can be fabricated relatively cheaply out of any convenient dimensionally stable material such as cardboard, plastics, etc., and while it must be sturdy enough for repeated use over a protracted period of time, it need not be especially strong or rigid. A preferred material for some applications is transparent plastic. The sizing device can be used, e.g. in a postal station, for deciding whether an item is deliverable as letter mail, or as a package or parcel.

BRIEF DESCRIPTION OF THE DRAWINGS

The invention will further be described, by way of example only, with reference to the accompanying drawings wherein.

DESCRIPTION OF THE PREFERRED EMBODIMENTS

The design of the receptacle is based upon three specified design criteria namely the maximum volume, the maximum length and the maximum width of a package or other item to be gauged. For an item of rectangular parallelepiped shape, the device will readily indicate whether or not the item fits within the predetermined values of length, width and volume. The generic formula for the dimensions of the receptacle are described below, the variables used in the design formula being defined as follows:

$V_{max}$—maximum volume as defined by design criteria (specified).

$L_{max}$—maximum length as defined by design criteria (specified).

$W_{max}$—maximum width as defined by design criteria (specified).

$H_{max}$—maximum height of an object (calculated).

L—length at any point along Side B.

W—width at any point along Side A.

H—height at any given length (L) or width (W) (calculated).

The first step in designing the device is to specify the design criteria. Numerical values for $V_{max}$, $L_{max}$ and $W_{max}$ are chosen such that $L_{max} \geqq W_{max}$. These parameters are used to calculate the dimensions of the device. All units must remain consistent.

Figure 1:
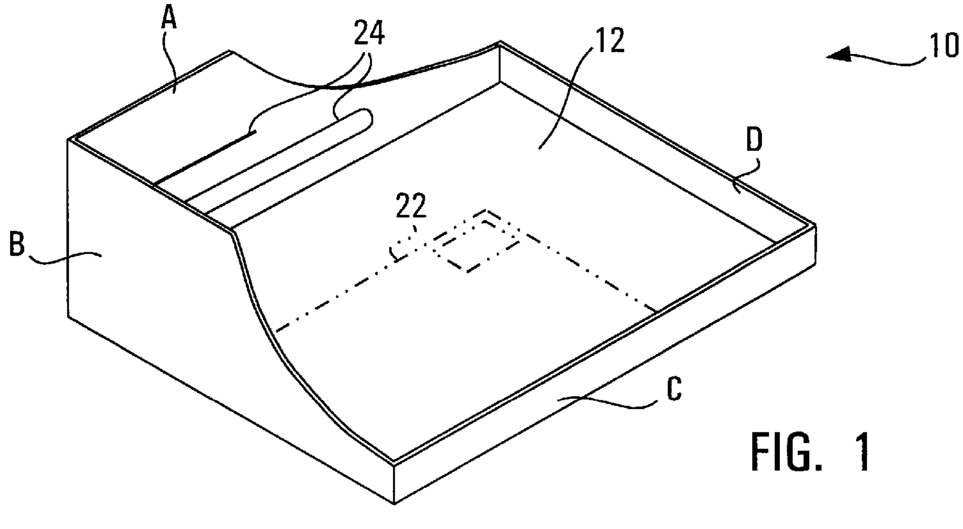
FIG. 1 is a perspective view of a presently preferred embodiment of sizing device useful in gauging items for mail delivery.

Referring to FIG. 1 the receptacle 10 shown therein comprises a thin-walled open top box having a rectangular base 12 from the edge of which project upstanding walls A, B, C and D. The receptacle is conveniently fabricated from cardboard or the like or provided as a molded plastic item. The base 12 has a length and a width that correspond to the maximum length and width that the device is intended to gauge, these values for convenience herein being referred to as $L_{max}$ and $W_{max}$ respectively.

Figure 2:
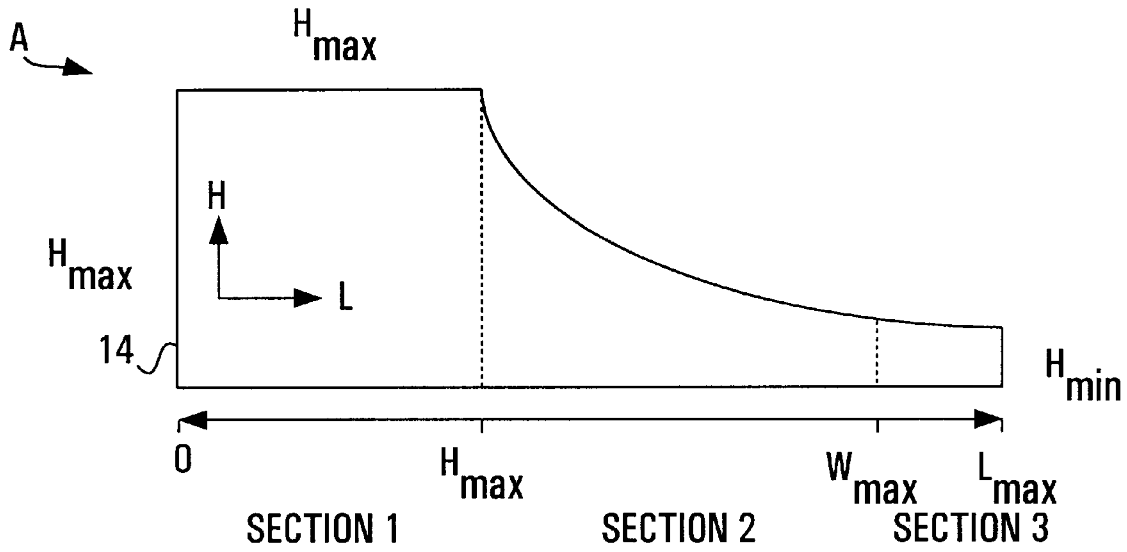
FIG. 2 is a view in elevation of one upstanding side wall of the sizing device.

The wall A is illustrated in FIG. 2 and has an overall length of $L_{max}$. As shown, the height of the wall A varies along its length. At the edge 14 where it adjoins the wall B the height of the wall (referred to here as $H_{max}$) corresponds to the cube root of the maximum volume $V_{max}$ that the device is intended to gauge. The length of the wall A can be considered as comprising three sections identified as section 1, section 2, section 3 in FIG. 2. In section 1 the height remains constant, the length of this section in the direction of the arrow L being $H_{max}$.

Figure 4:
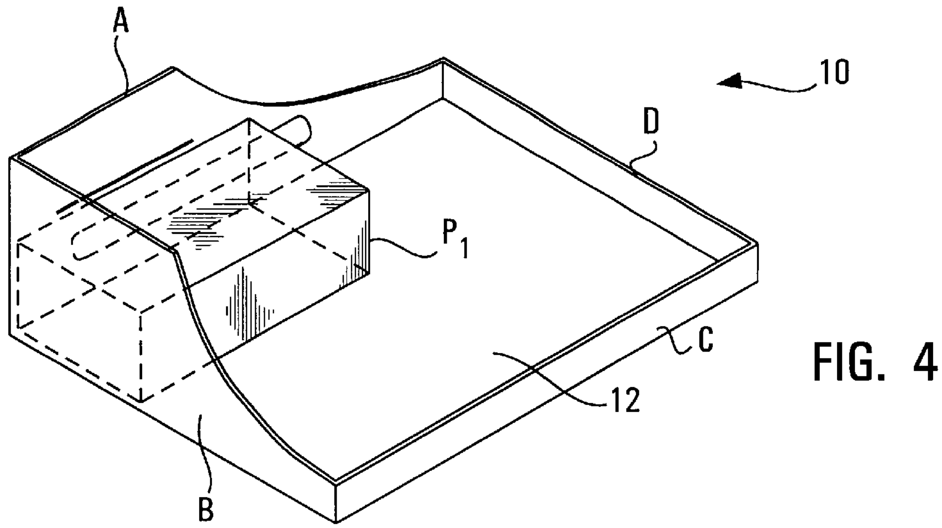
FIGS. 4 and 5 are views similar to FIG. 1 showing the sizing device in use.
Figure 5:
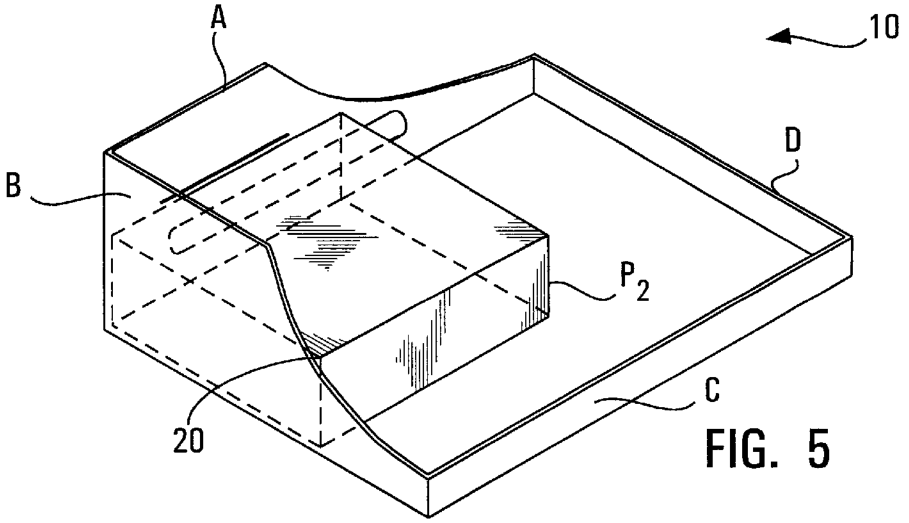

FIGS. 4 and 5 illustrate the receptacle in use. In each case the item is inserted in the receptacle 10 against the corner where the walls A and B adjoin, with the longest dimension of the item aligned along the wall A and the second longest dimension of the item aligned along the wall B. Referring to FIG. 4, it is evident that the length and width of the item P1 are less than $L_{max}$ and $W_{max}$; it is also obvious that the volume of the item is less than $V_{max}$ since no part of the item size that is against the wall A or the wall B projects above the upper edge of that wall.

Referring to FIG. 5 the item P2 is inserted into the receptacle as described above against the walls A and B and it immediately becomes apparent that, although the length and width of the item are less than the maximum values $L_{max}$ and $W_{max}$, the volume of the item exceeds $V_{max}$ since one corner 20 of the item projects above the upper edge of a section of the wall B.

The receptacle thus provides a means for very rapidly gauging whether or not an item of rectangular parallelepiped shape fits within the size criteria that have been established.

It will be understood that based upon the design principles outlined above, a receptacle suitable for gauging any combination of length, width, height and volume can be devised.

The receptacle can bear further indicia to measure other parameters, e.g. the base wall 12 may bear indicia 22 (FIG. 1) for gauging the length and width of an envelope. Furthermore, slots and the like 24 (FIG. 1) can be provided in one of the walls to determine whether or not an item meets other size criteria. For example, for determining if an item such as a letter is within the maximum height/thickness and width or length specification, it will often be easier to gauge whether the item fits within the slot rather than to gauge with the naked eye as to whether it is within the applicable maximums defined by the other aspects of the sizing receptacle 10. The receptacle could include two slots (not shown) one set to gauge thickness and length, and the other set to gauge thickness and width. The item could then be gauged through two slots with appropriate orientation, as an alternative to utilizing the template indicia 22 shown in FIG. 1.

Figure 3:
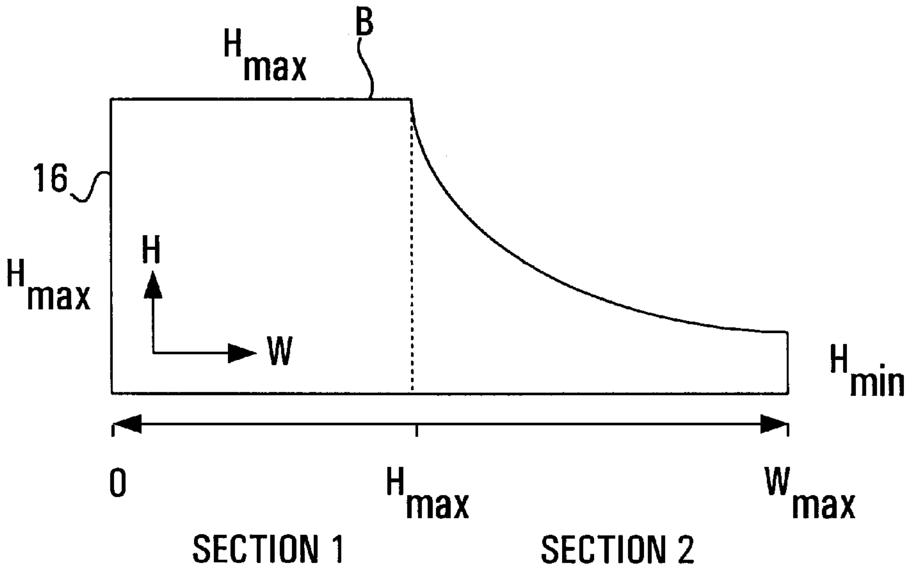
FIG. 3 is a view in elevation of the second upstanding wall of the sizing device.

The walls C and D shown in FIGS. 1 to 3 are in fact unnecessary and can be omitted, as indeed could the base wall 12. The essential components of the device are the two walls A and B that extend at right angles to each other and that have along their upper edges heights that vary in the manner described above.

In section 2 the height of the wall A varies in the length direction as a function of the length, this height being established by the equation $$H=V_{max}\div L^2$$

The length of sections 1 and 2 added together are equal to $W_{max}$, and in section 3 the height continues to change along the length, the height in this section being established from the equation $$H=V_{max}\div(L\times W_{max})$$

Similarly referring to FIG. 3 which represents the wall B, this side has two sections identified as section 1 and section 2. Section 1 is similar to section 1 in FIG. 2 and has a height H and a width W each equal to $W_{max}$.

In section 2 the height diminishes with distance from section 1 in accordance with the equation $$H=V_{max}\div W^2$$

where W is the distance in the direction indicated by the arrow W from the vertical edge 16.

The height of the walls C and D is the same as the height of the ends of the walls A and B and is given by the equation $$H\ C,\ D=V_{max}\div(W_{max}\times L_{max})$$

Within the device itself minimum values of length, width, and volume can also be provided for. The same formulas as set out above would be used to calculate the minimum values to determine the height at which the threshold reference lines for the minimum aspect of the specifications would be drawn on the inside of the device. In this way, the device can be set up for one or more multiple categories with both minimum and maximum specifications. Similarly, it can also be set up for multiple categories with only maximum specifications provided that the values for the length, width and volumes of each category subsequent to the one that is used for determining the height of the sides of the device (that one being the "Initial Category") are all less than the corresponding values of the Initial Category. The reference lines for each category other than the Initial Category would then be drawn on the inside of the device. If the device is manufactured from transparent material, the device would be easier to use and with such material the reference lines could be either on the inside or outside of the device. Different coloured lines for each category that the device is set up for would also make the device easier to use.

Figure 6:
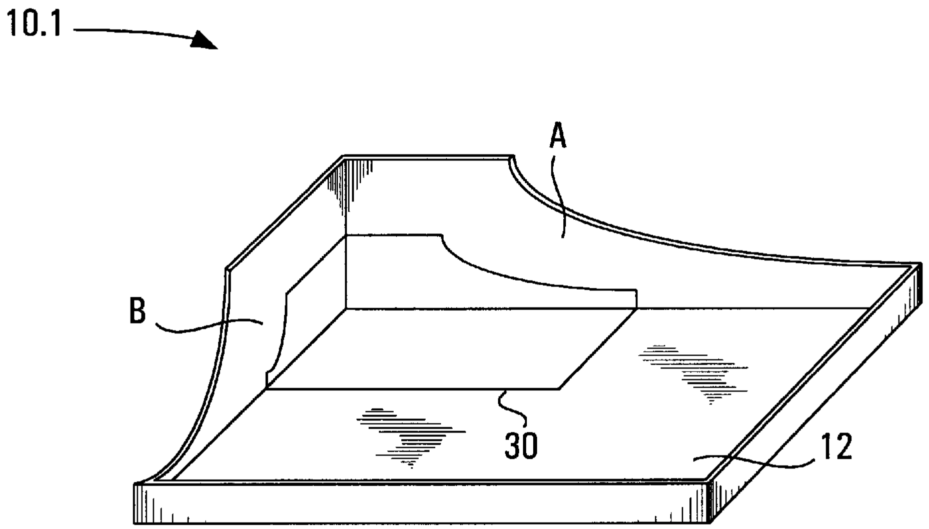
FIGS. 6, 7 and 8 are perspective views (at a different orientation than FIG. 1) showing other embodiments of sizing/measuring devices in accordance with the invention.

It is possible to arrange the device so that in addition to indicating maximum values for length, width and volume, it can also identify minimum values for these measurements, and such a device is shown at 10.1 in FIG. 6. The device 10.1 has walls A and B as in the embodiment of FIGS. 1 to 5, but in addition has an outline 30 drawn on the base 12 and on the walls A and B indicating an array of minimum values for the length, width and volume of an item. Thus the device 10.1 will define a category for an item having a length, width and volume falling between the maximum values defined by the walls A and B and the base 12, and the minimum values defined by the outline 30.

The same formulas as set out in the preceding discussion can be used to calculate the minimum values to determine the height at which the threshold reference lines of the outline 30 representing minimum values should be drawn.

Figure 7:
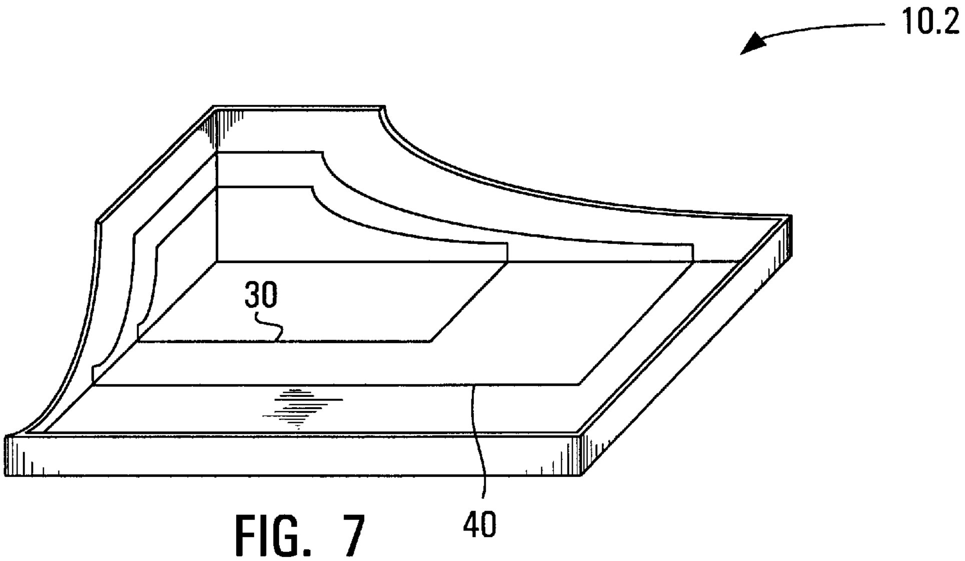

In this way, the device can be set up to measure or to gauge a plurality of minimum and maximum specifications, and such an arrangement is shown in FIG. 7 wherein the device 10.2 includes in addition to the minimum outline 30, an intermediate outline 40, the outlines representing different volume figures, e.g. 25 cubic inches (30), 50 cubic inches (40), and 75 cubic inches (the profiles of the walls A, B, C and D). These outlines in FIG. 7 can be utilized for example as maximums to define the maximum sizes for given categories, or can be used for defining upper and lower limits for the sizes of different categories.

The walls of the devices 10, 10.1 and 10.2 are transparent to enable the item being tested to be viewed through the walls, and the outlines 30 and 40 are formed as distinctive lines e.g. of different colours in the walls of sides A and B. Indeed, the upper edges and curved lines shown in the walls A and B in FIGS. 1 to 5 could be represented by lines drawn on these walls, so that these walls could in fact be of rectangular or other shape. The outlines 30, 40 etc. would be made visually distinctive, e.g. by colour lines on transparent plastic walls to facilitate use of the device.

Figure 8:
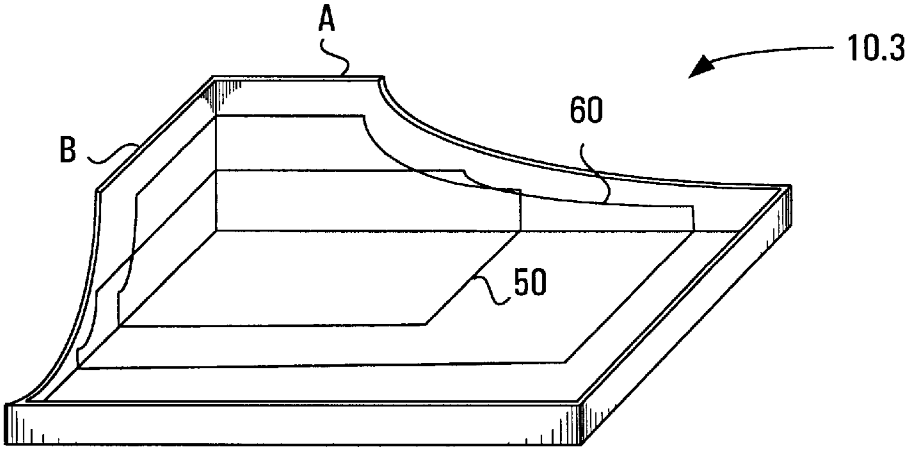

FIG. 8 represents a device 10.3 similar to FIG. 7 but marked to measure or gauge items with multiple dimensional specifications, the items being of different types. Accordingly the device of FIG. 8 includes outlines 50 and 60 in the transparent walls A and B, which outlines can be of varying configurations. In all embodiments the lines, e.g. 50 and 60 can be marked on the inner or outer sides of the respective walls of the device which as mentioned can be transparent if desired.

We claim:

1. A sizing device for indicating whether an item has dimensions that lie within predetermined maximum values of length, width, and volume, comprising:

a receptacle that has first and second side walls extending upwardly at right angles to each other to define a vertical corner, each said side wall defining a line having:

a first section adjoining said corner and having a constant height that corresponds to the cube root of said predetermined maximum value of volume, and adjoining said first section a second section that has a height that decreases with increasing distance from said corner in inverse relation to the square of a respective one of said predetermined maximum values of length and of width.

2. A sizing device as claimed in claim 1 wherein each said line constitutes an upper edge of the respective wall.

3. A sizing device as claimed in claim 1 wherein said first and second side walls extend upwardly from adjoining edges of a base wall which is at right angles to both said first and second side walls.

4. A sizing device as claimed in claim 3 wherein said base wall is of rectangular shape and has third and fourth upstanding side walls opposite to said first and second side walls, said third and fourth side walls being of equal height.

5. A sizing device as claimed in claim 3 wherein said base wall also includes markings on the upper side thereof for gauging the size in length and width of items for delivery.

6. A sizing device as claimed in claim 1 fabricated from a stiff cardboard material.

7. A sizing device as claimed in claim 1 fabricated in a stiff plastic material.

8. A sizing device as claimed in claim 1 fabricated from a stiff transparent material and further including at least one additional outline marked on said first wall and said second wall defining interrelated dimensions of length, width and volume establishing limiting values for a size category of said item.

9. A sizing device as claimed in claim 8 set up for gauging items of a plurality of different size categories, the limiting outlines corresponding to each size category being placed in lines of different colour.

10. A sizing device as claimed in claim 9 wherein said walls are fabricated in a transparent material.

11. A sizing device as claimed in claim 1 wherein one wall of said receptacle is formed with a slot of predetermined size corresponding to a maximum 1) thickness, and 2) length or width, of an item for delivery.

* * * * *

UNITED STATES PATENT AND TRADEMARK OFFICE
CERTIFICATE OF CORRECTION

PATENT NO . 6,138,371

DATED : October 31, 2000

INVENTOR(S) : Thomas Georg Lippa, et al.

It is certified that an error appears in the above-identified patent and that said Letters Patent are hereby corrected as shown below:

In Col. 3, at line 36, replace "+" with -- ÷ --.

In Col. 3, at line 43, replace "+" with -- ÷ --.

In Col. 3, at line 51, replace "+" with -- ÷ --.

In Col. 3, at line 58, replace "+" with -- ÷ --.

Signed and Sealed this

Eighth Day of May, 2001

*Attest:*

Nicholas P. Godici

NICHOLAS P. GODICI

*Attesting Officer*

*Acting Director of the United States Patent and Trademark Office*